March 25, 1930.  J. OPPERMANN  1,751,655

COLLAR STIFFENER

Filed April 22, 1929

Inventor
John Oppermann
By his Attorney

Patented Mar. 25, 1930

1,751,655

UNITED STATES PATENT OFFICE

JOHN OPPERMANN, OF NEW YORK, N. Y.

COLLAR STIFFENER

Application filed April 22, 1929. Serial No. 357,020.

This invention relates to improvements in collars, particularly so-called turn-down collars of the soft or semi-soft type, and more particularly to a stiffening means for such collars.

It is a well known fact that soft collars become soon unsightly as their flaps or wings wrinkle and crinkle during wearing and it is the principal object of my invention to provide a simple means for efficiently preventing such wrinkling.

Another object of my invention is the provision of a collar stiffening means composed of two substantially interlocking members, one embedded in the wing and the other in the band of the collar.

A further object of my invention is the provision of a collar stiffening means which can readily be applied to any collar at present in use without necessitating complicated and expensive changes therein.

A still further object of my invention is the provision of a stiffener for the wings of soft or semi-soft collars the members of which can conveniently be locked in their engaging position, yet allow a ready separation.

These and other objects of my invention will become more fully known as the description thereof proceeds and will then be specifically defined in the appended claims.

In the accompanying drawing, forming a material part of this disclosure:—

Figure 1:
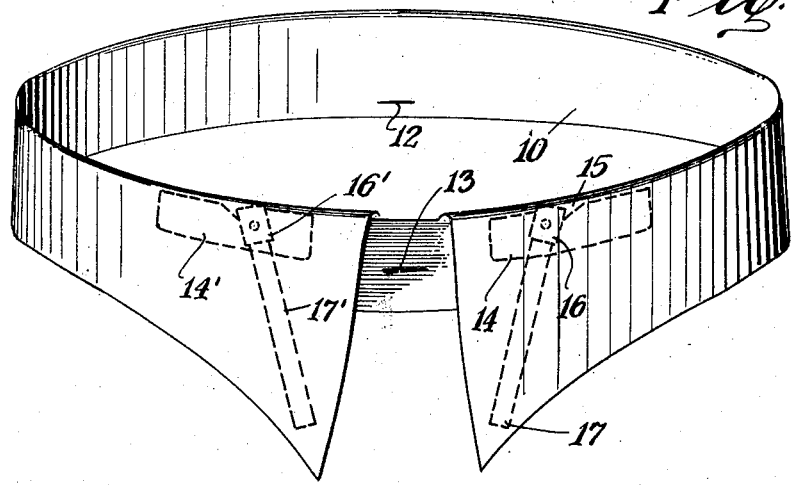
Fig. 1 illustrates a collar equipped with a stiffener constructed according to my invention.
Figure 2:
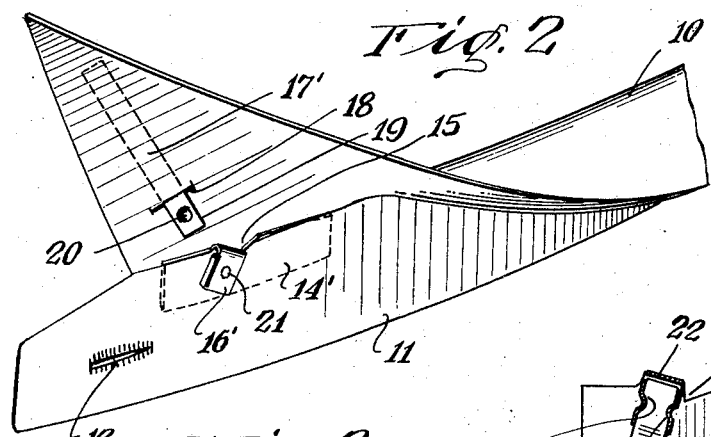
Fig. 2 is a fragmentary view of the collar having one of its wings upturned and illustrating the application of the members of the stiffening means to wing and collar band.
Figure 3:
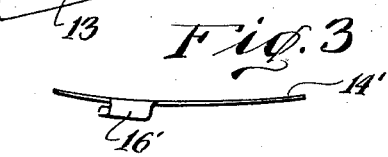

Fig. 3 is a top edge view of one of the stiffener members.

Figure 4:
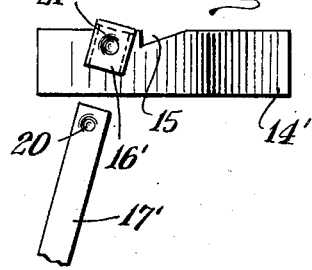

Fig. 4 shows the stiffener separate from the collar and on a somewhat enlarged scale with the members of the stiffener separated.

Figure 5:
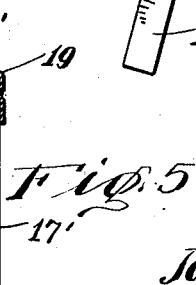

Fig. 5 is a longitudinal section through the stiffener with its members engaged.

Figure 6:
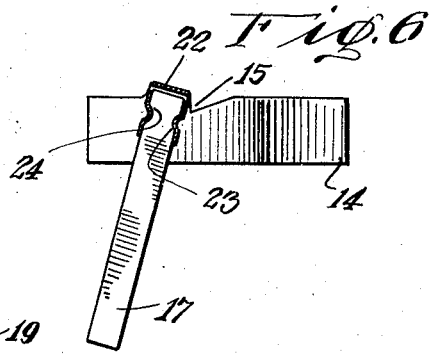

Fig. 6 is a sectional front view of the sleeve portion of a modified form of my invention, said sleeve forming one stiffener member with the other member engaged therein.

As illustrated, a turn-down collar 10 of the soft or semi-soft type has an inner lower body band 11, rear button hole 12, and front button holes 13 in the overlapping projecting band ends. All these parts are of the usual conventional type.

To the inner faces of the band 11, near the meeting ends of the wings plates 14, 14' are sewed or otherwise attached, having their bodies entirely hidden within the material of the collar band.

The upper edges of these plates have a substantially V-shaped recess 15 formed therein, and, sleeves or sockets 16, 16' are integrally formed with said plates and bent to substantially project and be bent over the forward or front faces of the plates spaced therefrom near the recesses 15 in said plates, these sockets form one member of the stiffener.

Into the inner lining of the collar wings stiffening means are introduced through slots 18 in the lining and held in position by sewing or other securing means, with their head parts 19 projecting therefrom, forming the second member of the stiffener.

The head parts 19 are provided with slight depressions 20 forming on the opposite side of these parts protuberances adapted to snap into or engage similarly shaped depressions 21 formed in the inner walls of the sockets.

In the modified form of my invention illustrated in Figure 6, the sleeve or socket member 22 has formed in its side edges protuberances 23 adapted to engage in suitable notches 24 in the side edges of the member 17.

The device operates as follows: After inserting the stiffener members 17, 17' into the lining of the collar through the slot 18 therein, the heads are engaged in the sockets 16, 16' and are held therein by engagement of the protuberances in the depressions with the sockets, and thus a stiffener for both wings of the collar is formed which will effectively prevent a wrinkling of the wings, preventing them from becoming unsightly during wearing of the collar.

It will be understood that I have disclosed the preferred form of my stiffener and that I may mark such changes in its construction as come within the scope of the appended claims without departure from my invention.

Having thus described my invention, what I claim as new and desire to protect by Letters Patent is:

1. A stiffener for the wings of turn-down soft and semi-soft collars comprising stiffener members inserted into the inner lining of the collar wings through slots therein, heads on said members projecting from the lining, and plates within the lining of the collar band, sockets formed with said plates having lower turned down mouths adapted to be engaged by the heads of said stiffening members, and a means for locking both members in their engaged positions.

2. A stiffening means for turn down collars of the soft and semi-soft type, comprising a pair of substantially straight and narrow stiffening members adapted to be inserted through slots in the inner lining of the collar and held therein, heads on said members projecting from said lining, protuberances in said heads, and plate members having upper notched edges held within the lining of the collar band, sockets formed from the material of said plates and turned to overlap the front faces of said plates with their mouths downwardly directed and adapted to receive the heads of said stiffening means, said sockets having depressions formed in their inner walls to receive the protuberances of said heads, for securely locking sockets and heads in their engaged position.

In witness whereof I have signed my name to this specification.

JOHN OPPERMANN.